May 15, 1934.   R. C. RIVERS   1,958,497
PEG BOLT AND THE LIKE
Filed Feb. 11, 1932
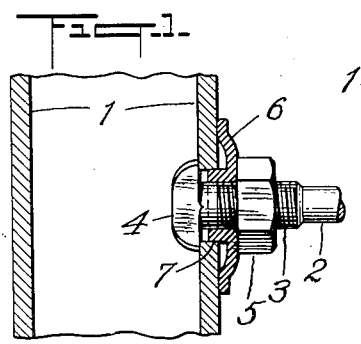
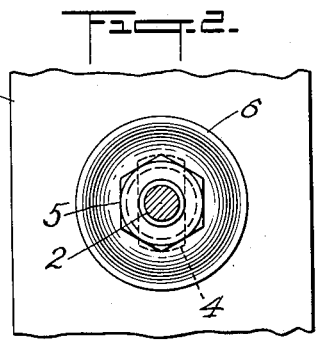
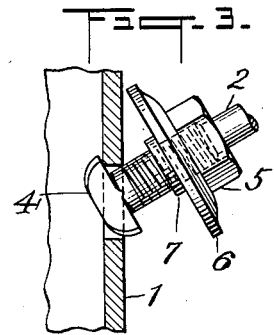
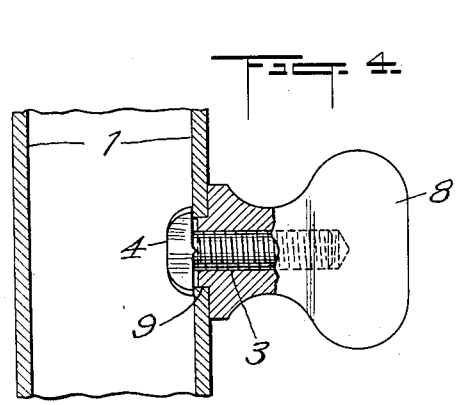
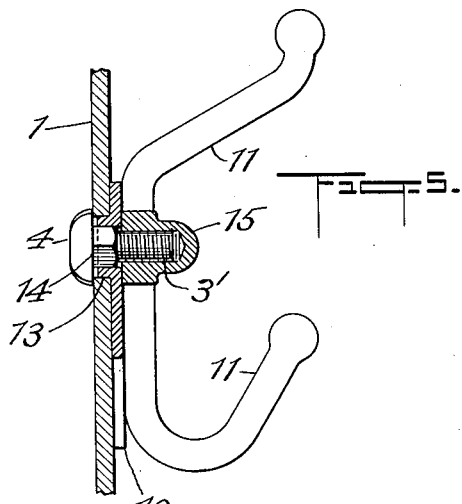
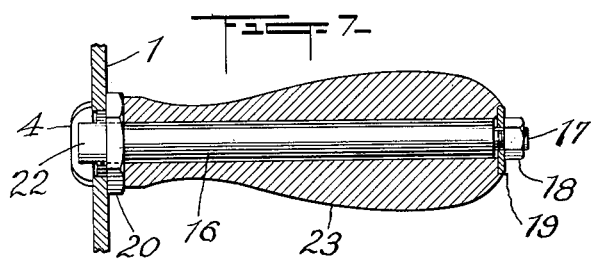
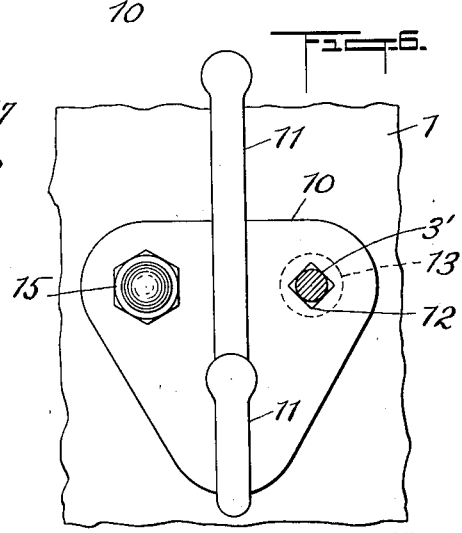
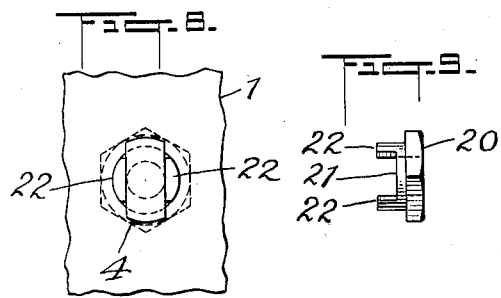
INVENTOR
RUSSELL C. RIVERS.
BY Sheffield & Betts,
HIS ATTORNEYS Patented May 15, 1934

1,958,497

UNITED STATES PATENT OFFICE 1,958,497

PEG BOLT AND THE LIKE

Russell C. Rivers, Worcester, Mass.

Application February 11, 1932, Serial No. 592,299

2 Claims. (Cl. 85—1)

This invention relates to supporting, attaching or connecting means in the nature of a bolt, which is adapted to be inserted in an opening in a panel, plate, or the walls of a container, the rear of which is comparatively inaccessible. Such devices have ordinarily been termed "peg bolts" because of the fact that they may be inserted from one side of a partition, plate or wall and secured into position, to hold the same firmly in place.

My improved device is particularly adapted for attaching hooks, such as have sometimes been used for supporting refrigerator shelves, and other kinds of hooks, handles or knobs that may be applied in various positions where the same are particularly useful.

One object of my invention is to provide such a bolt that the head may be inserted through an opening of circular shape, without the necessity of cutting slots or other shapes of openings.

For a detailed description of several forms of my invention which I at present deem sufficient, reference may be had to the following specification and to the accompanying drawing, in which Fig. 1 is a longitudinal sectional view of my improved peg bolt applied to a hollow body the interior of which is not easily accessible;

Fig. 2 is an end view thereof;

Fig. 3 is a longitudinal elevation showing the part to which it is applied in section, and illustrating the manner in which the head of the bolt is inserted in a circular opening;

Fig. 4 is a longitudinal sectional view of my improved bolt used for retaining a knob, or similar device, in the desired position;

Fig. 5 is a side elevation, partly in section, of the use of my improved attaching device, applied to a coat hanger;

Fig. 6 is a front elevation thereof;

Fig. 7 is a sectional view of my improved bolt as used for holding a handle in position upon any desired panel, wall or plate;

Fig. 8 is an elevation of the inner end of the device, as illustrated in Fig. 7; and Fig. 9 is a side elevation of the form of washer or nut illustrated in Fig. 7.

Referring to the drawing, the numeral 1 indicates the walls of a hollow body, such as a hollow tube, the space between the walls of a refrigerator, or any other container or device to which the bolt is adapted to be attached. The numeral 2 indicates the bolt proper, which is threaded as indicated at 3, and provided with a head 4 which, as is indicated, is formed by two laterally extending lugs which are of a width approximately equal to that of the diameter of the bolt, and obviously may be made in the shape of an ordinary circular bolt head, but having the sides removed therefrom. The numeral 5 indicates a nut of the usual form, adapted to engage the threads 3. The numeral 6 indicates a special form of washer, which is preferably provided with an inwardly projecting cylindrical flange 7, which may be integral with or attached to the main portion of the washer 6. The washer 6, as indicated, is preferably of a convex shape in section, which gives it some resiliency so that when placed in position, the pressure caused by the nut 5 may be varied, and the washer 6 caused to contact with the surface 1 in a more uniform manner.

Referring to Fig. 1, it will be noticed that the flange 7 is adapted to fill in the space between the end of the bolt 2 and the edges of the circular opening, in order that the bolt may be centered therein and held in the desired position. The method of inserting the bolt in the opening is illustrated in Fig. 3, where it will be appreciated that the head 4 is first caused to have one end passed through the opening, so that it lies back of the edge thereof. The lower end of the head is thereafter pushed in past the lower part of the opening, so that the whole head will lie inside the plate 1. Thereafter, the washer 6 is moved along the thread portion 3 of the bolt, until the flange 7 enters the opening around the bolt. Thereupon the nut 5 may be screwed up the necessary amount, to hold the parts with the desired tension.

The form of the device illustrated in Fig. 4 is similar to that illustrated in the previous figures, except that no separate washer is required, and the knob 8 performs the function of the nut 5, the washer 6 and flange 7, by being provided with a flange 9 at its inner end, which enters the opening in the wall 1 in a manner similar to the entry of the flange 7 described in connection with the device of Fig. 1.

In Figs. 5 and 6, I have illustrated a modification in which the principle of my improved peg bolt is utilized for attaching a coat hanger in position upon a wall or plate, in a manner similar to that previously described. In this case the plate 10 serves as a support for the double clothes hook 11, the hook being attached to said plate in any suitable well-known way. The plate 10 is provided with two preferably square holes 12, and the rear surfaces thereof are formed so as to have projecting flanges 13. The flanges 13 have an external diameter substantially the same as that of the holes in the plate 1, to which the hooks are to be attached.

The screw threaded portions 3' of this device are preferably provided with square terminal portions 14, which are preferably made integral with the elongated heads 4. The square portions 14 are adapted to fit the square holes 12 in the plate 10. It will now be seen that the heads 4 on the supporting bolts 3 may be inserted into the holes in the plate 1, in a manner as described in connection with Fig. 3. The plate 10 may then be placed over the bolts 3, and the flanges 13 caused to enter the holes in the plate 1 around the square portions 14 of the bolts. Thereafter the screw threaded caps or nuts 15 are screwed into position to hold the complete device in the desired position. It will be appreciated that in this form of device, the square portions 14 of the bolt prevent the screw threaded portions 3' thereof from turning when the caps or thimbles are being screwed into position.

Referring now to Figs. 7, 8 and 9, it will be seen that I have provided a construction which is quite similar to the construction referred to above, but certain variations are made in order to provide additional advantages. The device illustrated in Fig. 7 is illustrated as constituting a handle to be attached to some plate or wall, where the same may be required. In this device, the main portion of the bolt is elongated to form a shaft 16, one end being provided with a head 4 similar to the heads above described. The shank 16, at its other end, is provided with a screw threaded portion 17 which is engaged by the nut 18 and the washer 19.

For centering the central portion of the shaft 16 in the hole 1, I provide a special form of washer 20, illustrated in Fig. 9. This has a flange 21 projecting from one side thereof, the flange being extended at two points, as at 22, so that the same may engage the flat surfaces at the sides of the elongated head 4. Said projections or extensions are therefore effective to prevent the washer from turning on the shank or shaft 16. In placing this form of the device in position, it will be obvious that the head is inserted in the opening in the plate 1 in the manner described in connection with Fig. 3. The washer 20 is then placed over the shank or shaft 16, and the flanges inserted through the opening until the projections 22 come in contact with the sides of the head 4. The main portion 23 of the handle is then placed in position, after which the washer 19 is placed over the screw threaded end 17 and the nut 18 screwed up to engage the washer with sufficient pressure. In tightening the terminal nut 18, a wrench or spanner may be applied to the angular portion of the washer 20, to prevent it from turning.

Having thus described these forms of my invention, it will be appreciated by one skilled in the art that various changes may be made to fit the same for different uses to which the bolt may be applied.

It is obvious that the device may be used in the place of ordinary bolts, to fasten the margins of two sheets or plates of material together, and various changes may be made in the form and arrangement of the contacting parts that will have substantially the same effect, without departing from the spirit or the scope of my invention, as set forth in the accompanying claims.

What I claim and desire to protect by Letters Patent, is:

1. In an attaching device of the kind described, capable of being inserted from one side in a substantially circular opening in a plate or wall, a substantially cylindrical main portion having screw threads thereon and laterally extending integral lugs carried thereby, said parts constituting a bolt, the diameter of said main portion together with the length of one of said lugs being substantially equal to the effective diameter of said opening, a screw threaded member carried by said main portion, a washer adapted to be held in position by said screw threaded member, said washer being flanged for centering said main portion in said opening, and complementary projections and locking surfaces on said washer and said bolt, respectively, for preventing relative rotary movement between the same.

2. In an attaching device of the kind described, capable of being inserted from one side in a substantially circular opening in a plate or wall, a substantially cylindrical main portion having screw threads thereon, an elongated head carried thereby, the diameter of said main portion together with the elongation forming one end of said head being substantially equal to the effective diameter of said opening, a screw threaded member carried by said main portion, and a washer adapted to be held in position by said screw threaded member and having a cylindrical flange for centering said main portion in said opening, said flange having projections adapted to engage the sides of said head.

RUSSELL C. RIVERS.